United States Patent
Kim et al.

(10) Patent No.: US 11,626,772 B2
(45) Date of Patent: Apr. 11, 2023

(54) SUCTION MOTOR AND VACUUM CLEANER HAVING SAME

(71) Applicant: Samsung Electronics Co., Ltd., Suwon-si (KR)

(72) Inventors: Deok-jin Kim, Hwaseong-si (KR); Jin-woo Han, Suwon-si (KR); Seon-goo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 16/637,722

(22) PCT Filed: Jul. 13, 2018

(86) PCT No.: PCT/KR2018/007974
§ 371 (c)(1),
(2) Date: Feb. 7, 2020

(87) PCT Pub. No.: WO2019/031720
PCT Pub. Date: Feb. 14, 2019

(65) Prior Publication Data
US 2020/0186004 A1 Jun. 11, 2020

(30) Foreign Application Priority Data
Aug. 9, 2017 (KR) .................. 10-2017-0101052

(51) Int. Cl.
*H02K 7/04* (2006.01)
*A47L 5/22* (2006.01)
(Continued)

(52) U.S. Cl.
CPC .................. *H02K 7/04* (2013.01); *A47L 5/22* (2013.01); *A47L 9/22* (2013.01); *H02K 7/14* (2013.01)

(58) Field of Classification Search
CPC ..... A47L 5/22; A47L 5/24; A47L 9/22; H02K 7/04; H02K 7/083; H02K 7/14
See application file for complete search history.

(56) References Cited

U.S. PATENT DOCUMENTS 5,831,360 A * 11/1998 Senjo .................. H02K 7/06
310/90
7,143,469 B2 12/2006 Moine et al.
(Continued)

FOREIGN PATENT DOCUMENTS

CN 1961808 A 5/2007
CN 201605427 U 10/2010
(Continued)

OTHER PUBLICATIONS

JP-2016153636-A—English Machine Translation (Year: 2016).*
(Continued)

*Primary Examiner* — Marc Carlson (57) ABSTRACT

A suction motor capable of having reduced axial length is disclosed. The suction motor according to the present invention comprises: a rotary shaft; an impeller fixed to one end of the rotary shaft; a bearing assembly provided at one side of the impeller and rotatably supporting the rotary shaft; a permanent magnet provided on the rotary shaft at one side of the bearing assembly; a weight balancer provided on the other end of the rotary shaft at one side of the permanent magnet; and a stator assembly provided at the circumference of the permanent magnet, wherein the weight balancer is formed such that when the rotary shaft rotates, the impeller, the permanent magnet and the weight balancer achieve rotational balance around the bearing assembly.

19 Claims, 11 Drawing Sheets

(51) Int. Cl.
*A47L 9/22* (2006.01)
*H02K 7/14* (2006.01)

(56) References Cited

U.S. PATENT DOCUMENTS

| | | | |
|---|---|---|---|
| 7,188,389 B2 | 3/2007 | Moine et al. | |
| 9,897,104 B2* | 2/2018 | King | F04D 29/5853 |
| 10,186,915 B2* | 1/2019 | Jang | H02K 9/06 |
| 10,729,218 B2* | 8/2020 | Childe | H02K 1/12 |
| 11,128,198 B2* | 9/2021 | Barnes | H02K 3/524 |
| 2002/0184731 A1* | 12/2002 | Moine | A47L 9/1409 15/352 |
| 2003/0037405 A1 | 2/2003 | Moine et al. | |
| 2007/0122277 A1* | 5/2007 | Oh | F04D 29/444 415/211.2 |
| 2009/0058208 A1* | 3/2009 | Kimura | H02K 5/1732 310/83 |
| 2010/0170057 A1* | 7/2010 | Lee | A47L 9/2884 15/319 |
| 2010/0196174 A1* | 8/2010 | Lee | F04D 25/082 310/156.53 |
| 2015/0311769 A1* | 10/2015 | Sawada | H02K 5/161 310/51 |
| 2016/0020656 A1* | 1/2016 | Brahmavar | H02K 1/2793 29/598 |
| 2016/0341219 A1* | 11/2016 | Li | F04D 29/281 |
| 2017/0164711 A1* | 6/2017 | Childe | A45D 20/00 |
| 2017/0170709 A1* | 6/2017 | Barnes | H02K 1/143 |
| 2017/0207689 A1* | 7/2017 | Suzuki | F04D 29/542 |
| 2017/0256999 A1* | 9/2017 | Turner | H02K 15/03 |
| 2018/0026486 A1* | 1/2018 | Jo | H02K 1/278 15/412 |
| 2020/0079420 A1* | 3/2020 | Takada | B62D 5/0403 |
| 2020/0186004 A1 | 6/2020 | Kim et al. | |
| 2020/0220402 A1* | 7/2020 | Watanabe | H02K 7/14 |
| 2021/0351659 A1* | 11/2021 | Maruyama | F04D 25/0606 |

FOREIGN PATENT DOCUMENTS

| | | | |
|---|---|---|---|
| CN | 106169819 A | | 11/2016 |
| CN | 106208515 A | * | 12/2016 |
| CN | 106208515 A | | 12/2016 |
| CN | 106224234 A | | 12/2016 |
| CN | 111031876 A | | 4/2020 |
| EP | 2651014 A2 | | 10/2013 |
| JP | 2010284007 A | | 12/2010 |
| JP | 2012-135188 A | | 7/2012 |
| JP | 2016-153636 A | | 8/2016 |
| JP | 2016153636 A | * | 8/2016 |
| JP | 2017-022971 A | | 1/2017 |
| KR | 10-1998-0072340 A | | 11/1998 |
| KR | 19980072340 A | * | 11/1998 |
| KR | 10-0721305 B1 | | 5/2007 |
| KR | 10-2008-0105593 A | | 12/2008 |
| KR | 10-0903519 B1 | | 6/2009 |
| KR | 10-1121841 81 | | 3/2012 |
| KR | 101121841 B1 | * | 3/2012 |
| KR | 20130091841 A | * | 8/2013 |
| KR | 10-2016-0003736 A | | 1/2016 |
| KR | 10-1696710 B1 | | 1/2017 |
| KR | 10-1696712 B1 | | 1/2017 |

OTHER PUBLICATIONS

Supplementary European Search Report dated Mar. 4, 2020 in connection with European Patent Application No. 18 84 3303, 8 pages.
Korean Intellectual Property Office "Notice of Preliminary Rejection" dated Jul. 23, 2021, in connection with Korean Patent Application No. 10-2017-0101052, 15 pages.
China National Intellectual Property Administration "Second Office Action" dated Sep. 14, 2021, in connection with Chinese Patent Application No. 201880051651.X, 9 pages.
China National Intellectual Property Administration, "First Office Action ", dated Feb. 22, 2021, in connection with Chinese Patent Application No. 201880051651.X, 19 pages.
International Search Report dated Oct. 12, 2018 in connection with International Patent Application No. PCT/KR2018/007974, 4 pages.
Written Opinion of the International Searching Authority dated Oct. 12, 2018 in connection with International Patent Application No. PCT/KR2018/007974, 6 pages.

* cited by examiner

SUCTION MOTOR AND VACUUM CLEANER HAVING SAME

CROSS-REFERENCE TO RELATED APPLICATIONS

This application is a 371 of International Application No. PCT/KR2018/007974 filed on Jul. 13, 2018, which claims priority to Korean Patent Application No. 10-2017-0101052 filed on Aug. 9, 2017, the disclosures of which are herein incorporated by reference in their entirety.

BACKGROUND

1. Field

The disclosure relates to a suction motor, and more particularly, to a suction motor for a vacuum cleaner.

2. Description of Related Art

A traditional vacuum cleaner has a structure in which a dirt suction port and a body installed with a dirt collection device are separated from each other.

However, recently, a vacuum cleaner in which a dirt suction port and a body are integrated with each other to increase convenience of use, for example, a robot cleaner or a handy-type cleaner has been released.

An entire size and a weight of the vacuum cleaner in which the dirt suction port and the body including the dirt collection device are integrated with each other as described above need to be reduced for convenience of the use. To this end, an internal component, particularly, a suction motor, of the vacuum cleaner needs to be compactly manufactured.

A vacuum cleaner that uses a brushless direct current (BLDC) motor instead of a brush motor to reduce a size of the suction motor has been sold. However, such a BLDC motor may have an entire size reduced compared with the brush motor according to the related art in terms of performance, but does not have a large difference from the brush motor according to the related art in terms of a structure of a motor.

That is, a motor for a vacuum cleaner according to the related art uses a structure in which both ends of a rotor are supported by installing bearings at both ends of the rotor to stably support the rotor that rotates.

To install the bearings at both ends of the rotor to support both ends of the rotor, structures capable of supporting the bearings are required at two places in an axial direction of the motor, and thus, there is a limitation in reducing a size of the motor in the axial direction of the motor.

Therefore, to reduce the size of the vacuum cleaner, a suction motor having a new structure in which a size of the motor in the axial direction may be reduced is required.

SUMMARY

The disclosure provides a suction motor capable of having a size reduced in an axial direction to make a vacuum cleaner compact, and a vacuum cleaner having the same.

According to an embodiment of the disclosure, a suction motor includes: a rotary shaft; an impeller fixed to one end of the rotary shaft; a bearing assembly installed on one side of the impeller and configured to rotatably support the rotary shaft; a permanent magnet installed on the rotary shaft on one side of the bearing assembly; a weight balance installed at the other end of the rotary shaft on one side of the permanent magnet; and a stator assembly installed around the permanent magnet, wherein the weight balance is formed so that the impeller, and the permanent magnet and the weight balance achieve rotational balance around the bearing assembly when the rotary shaft rotates.

The bearing assembly may include: a first bearing installed on one side of the impeller and configured to rotatably support the rotary shaft; a second bearing installed to be spaced apart from the first bearing and configured to rotatably support the rotary shaft; a spacer installed between an inner race of the first bearing and an inner race of the second bearing; a wave washer installed between an outer race of the first bearing and an outer race of the second bearing; and a sleeve configured to fix the outer race of the first bearing and the outer race of the second bearing and formed in a hollow cylindrical shape.

A gap between the first and second bearings may be equal to or smaller than an outer diameter of the first bearing or the second bearing.

Alternatively, a gap between the first and second bearings may be equal to or smaller than a height of the first bearing or the second bearing.

According to another embodiment of the disclosure, a suction motor includes: a rotary shaft; an impeller fixed to one end of the rotary shaft; a first bearing configured to rotatably support the rotary shaft on one side of the impeller; a second bearing installed to be spaced apart from the first bearing and configured to rotatably support the rotary shaft; a spacer installed between an inner race of the first bearing and an inner race of the second bearing; a sleeve configured to fix an outer race of the first bearing and an outer race of the second bearing and formed in a hollow cylindrical shape; a permanent magnet installed on the rotary shaft on one side of the second bearing; a weight balance installed at the other end of the rotary shaft on one side of the permanent magnet; and a stator assembly installed around the permanent magnet, wherein a gap between the first and second bearings is equal to or smaller than an outer diameter of the first bearing or the second bearing.

The rotary shaft between the second bearing and the permanent magnet may be provided with a sub-weight balance, and the sub-weight balance may be configured to support the inner race of the second bearing.

The suction motor including any one of the features described above may be applied to a vacuum cleaner including a dirt collection device connected to the suction motor.

In the suction motor according to an embodiment of the disclosure having the structure as described above, a size of the suction motor in an axial direction may be reduced. Therefore, when such a suction motor is used, a vacuum cleaner may be miniaturized.

DETAILED DESCRIPTION

Hereinafter, embodiments of a suction motor and a vacuum cleaner having the same according to the disclosure will be described in detail with reference to the accompanying drawings.

As described below are illustratively provided to assist in understanding of the disclosure, and it is to be understood that the disclosure may be variously modified and executed unlike embodiments described herein. However, when it is decided that a detailed description for the known functions or components related to the disclosure may obscure the gist of the disclosure, the detailed description and concrete illustration will be omitted. Further, the accompanying drawings are not illustrated to scale, but sizes of some of components may be exaggerated to assist in the understanding of the disclosure.

Figure 1:
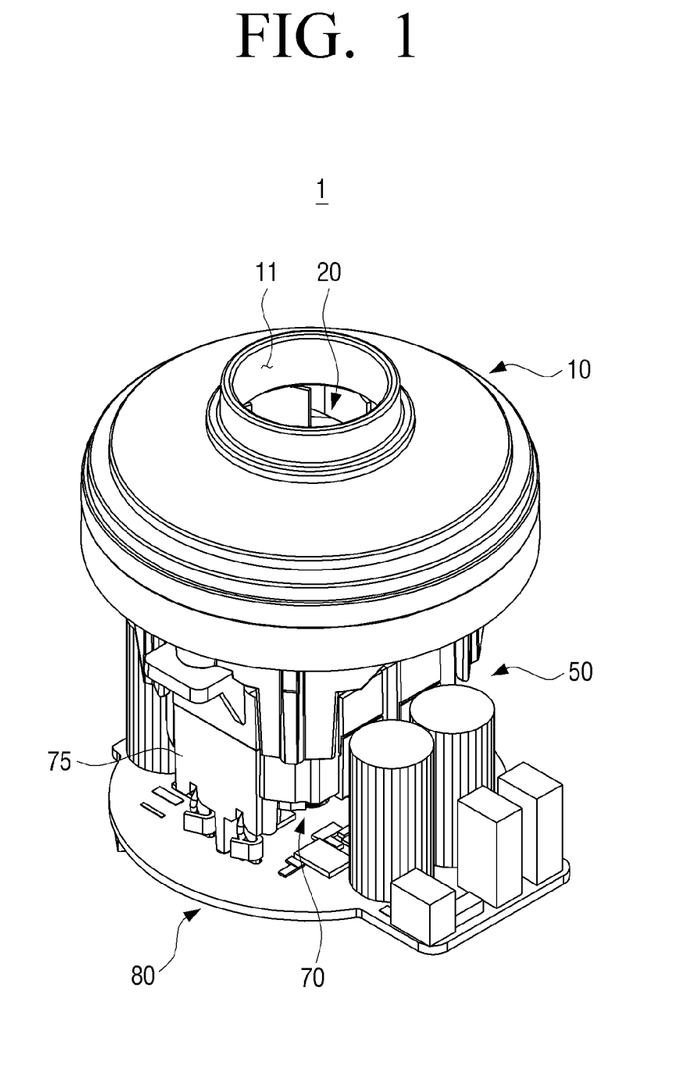
FIG. 1 is a perspective view illustrating a suction motor according to an embodiment of the disclosure.
Figure 2:
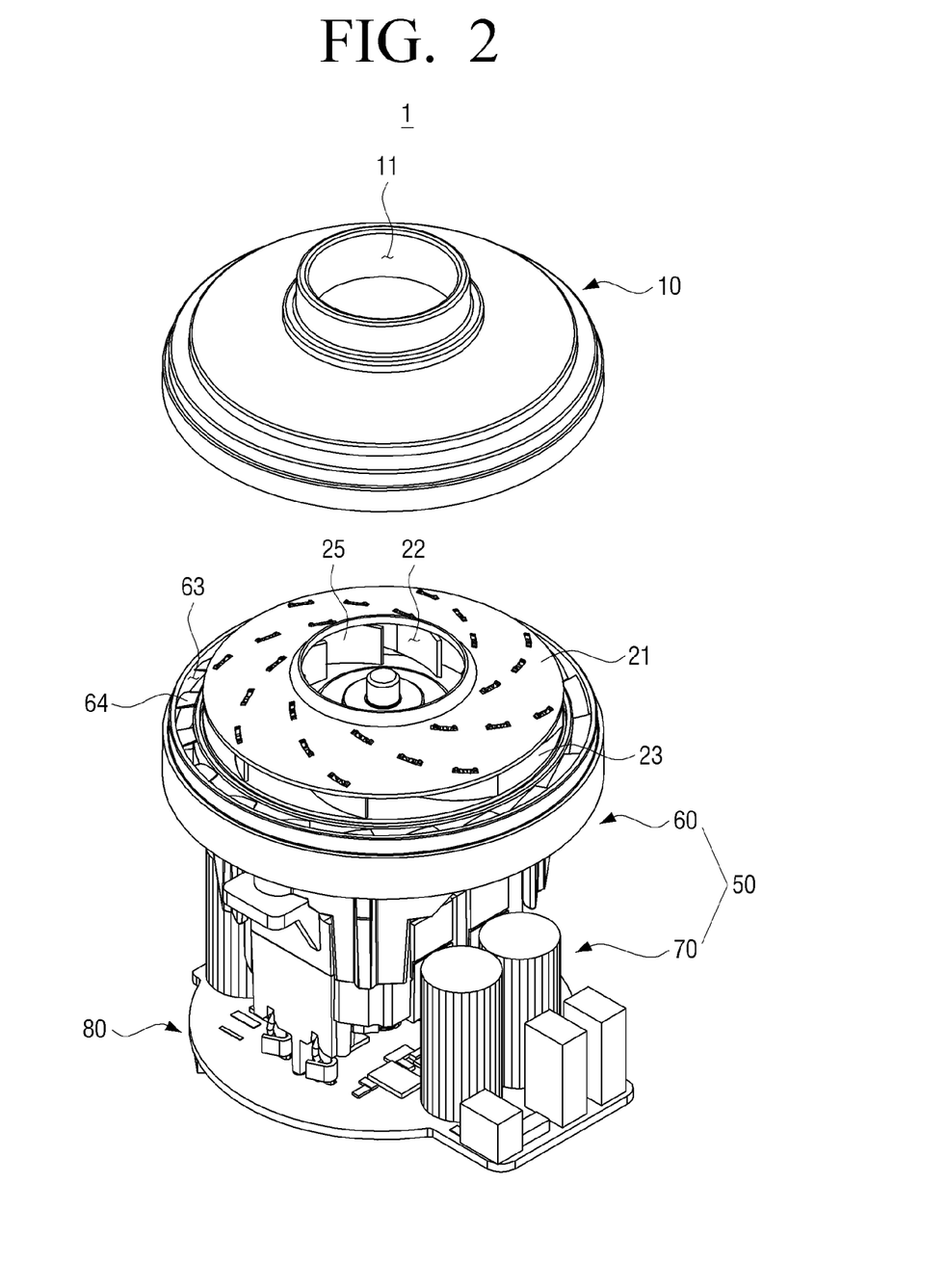
FIG. 2 is a perspective view illustrating a state where an inlet cover is separated from the suction motor of FIG. 1.
Figure 3:
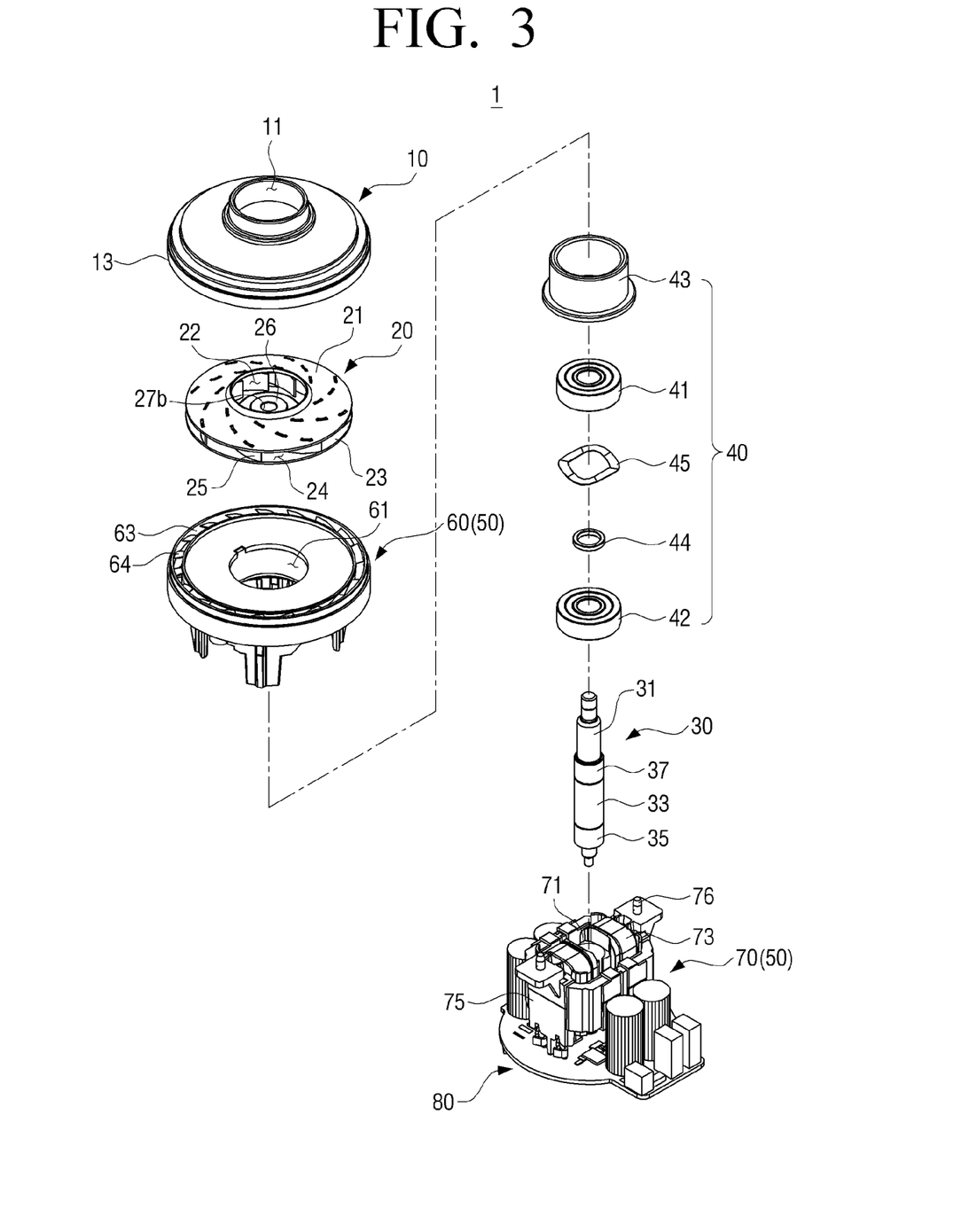
FIG. 3 is an exploded perspective view of the suction motor of FIG. 1.
Figure 4:
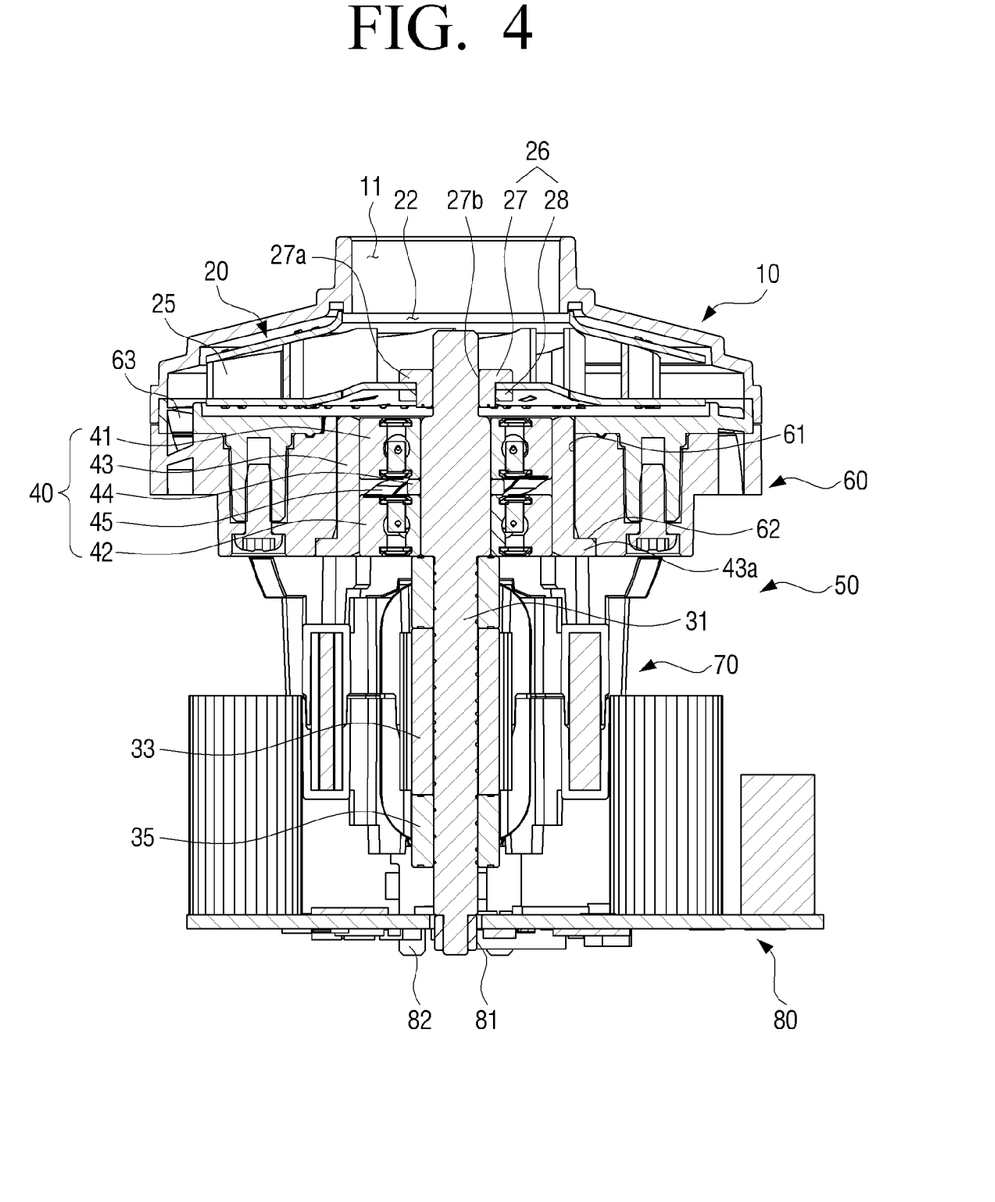
FIG. 4 is a longitudinal cross-sectional view of the suction motor of FIG. 1.

FIG. 1 is a perspective view illustrating a suction motor according to an embodiment of the disclosure, and FIG. 2 is a perspective view illustrating a state where an inlet cover is separated from the suction motor of FIG. 1. FIG. 3 is an exploded perspective view of the suction motor of FIG. 1, and FIG. 4 is a longitudinal cross-sectional view of the suction motor of FIG. 1.

Referring to FIGS. 1 to 4, a suction motor 1 according to an embodiment of the disclosure includes an inlet cover 10, an impeller 20, a rotor 30, a bearing assembly 40, and a stator assembly 50.

The inlet cover 10 is installed above the impeller 20 to generally cover the impeller 20. The inlet cover 10 is formed in a substantially conical shape, and has an inlet 11 formed at the center thereof. The inlet cover 10 is spaced apart from the impeller 20, such that the impeller 20 may freely rotate without interference by the inlet cover 10. The inlet 11 of the inlet cover 10 is connected to a dirt collection device of a vacuum cleaner. Therefore, air discharged from the dirt collection device is introduced into the suction motor 1 through the inlet 11.

In addition, an edge 13 of the inlet cover 10 is formed to surround an outer circumferential surface of the impeller 20, and may thus function as a duct guiding air discharged from the impeller 20.

The impeller 20 is installed at one end of the rotor 30, and rotates integrally with the rotor 30. When the impeller 20 is rotated by the rotor 30, a suction force for sucking external air is generated.

The impeller 20 may include an upper plate 21 provided with a suction port 22, a lower plate 23 fixed to one end of the rotor 30, and a plurality of blades 25 installed between the upper plate 21 and the lower plate 23.

The upper plate 21 is formed in a substantially conical shape having a gradient corresponding to the inlet cover 10, and a circular suction port 22 is formed at the center of the upper plate 21. The suction port 22 is formed to have a size corresponding to that of the inlet 11 of the inlet cover 10.

The lower plate 23 is formed in a substantially disk shape, and one end of the rotor 30 is coupled to the center of the lower plate 23. Specifically, the lower plate 23 is fixed to one end of a rotary shaft 31 of the rotor 30. The lower plate 23 may be fixed to one end of the rotary shaft 31 using a coupling boss 26.

The coupling boss 26 is configured to include an upper coupling boss 27 and a lower coupling boss 28. The upper coupling boss 27 is formed in a hollow cylindrical shape, and has a flange 27a provided at one end thereof. A hollow 27b of the upper coupling boss 27 is formed to have a diameter into which one end of the rotary shaft 31 may be inserted. For example, the hollow 27b of the upper coupling boss 27 may be formed so that one end of the rotary shaft 31 is press-fitted thereinto by press-fitting. The lower coupling boss 28 is formed in a ring shape, and has an inner diameter corresponding to an outer diameter of the upper coupling boss 27 described above. Therefore, when the lower coupling boss 28 is fixed to the upper coupling boss 27 protruding downward of the lower plate 23 in a state where the flange 27a is caught by the lower plate 23 by inserting the upper coupling boss 27 into a through-hole of the lower plate 23, the coupling boss 26 is fixed to the lower plate 23. Subsequently, when one end of the rotary shaft 31 is press-fitted into the hollow 27b of the upper coupling boss 27, the impeller 20 is fixed to the rotary shaft 31.

The plurality of blades 25 are installed radially at regular intervals around the suction port 22 between the upper plate 21 and the lower plate 23, and are formed to discharge air introduced through the suction port 22 of the upper plate 21 in an outer circumferential direction of the impeller 20. Therefore, the outer circumferential surface of the impeller 20 is provided with a plurality of openings 24 which are formed by the plurality of blades 25 and through which the air is discharged.

The rotor 30, which rotates the impeller 20, may include the rotary shaft 31, a permanent magnet 33, and a weight balance 35.

The rotary shaft 31 is formed in a rod shape having a circular cross section, and includes an impeller fixing portion 31a (see FIG. 5) to which the impeller 20 is fixed, a bearing support portion 31b (see FIG. 5) which is supported by the bearing assembly 40, and a permanent magnet portion 31c (see FIG. 5) on which the permanent magnet 33 (see FIG. 5) is installed, in a length direction.

The impeller fixing portion 31a is provided at one end of the rotary shaft 31, and is formed to have a diameter at which it may be coupled to the hollow 27b of the upper coupling boss 27 coupled to the lower plate 23 of the impeller 20. Therefore, the impeller 20 is fixed to one end of the rotary shaft 31 by the coupling boss 26. The bearing support portion 31b is provided between the impeller fixing portion 31a and the permanent magnet portion 31c. The bearing support portion 31b may be formed to have a diameter larger than those of the impeller fixing portion 31a and the permanent magnet portion 31c. The permanent magnet portion 31c is provided on one side of the bearing support portion 31b, and the permanent magnet 33 is installed on the permanent magnet portion 31c. A lower end of the permanent magnet portion 31c may be provided with a sensor portion 31d (see FIG. 5) on which a magnet 81 for position detection is installed.

Figure 5:
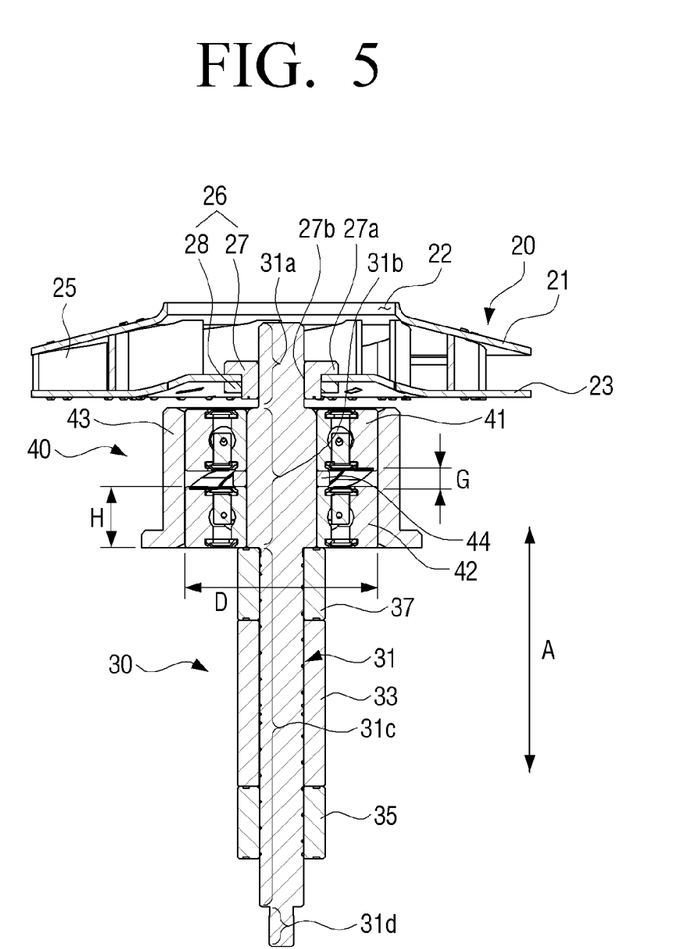
FIG. 5 is a longitudinal cross-sectional view illustrating a rotor assembly of the suction motor according to an embodiment of the disclosure supported by a bearing assembly.

The permanent magnet 33 is installed on the permanent magnet portion 31c provided on one side of the bearing support portion 31b of the rotary shaft 31. The permanent magnet 33 is formed in a hollow cylindrical shape, and is fixed to the permanent magnet portion 31c of the rotary shaft 31. The permanent magnet 33 rotates integrally with the rotary shaft 31.

The weight balance 35 is installed on the rotary shaft 31 on one side of the permanent magnet 33. The weight balance 35 is fixed to the rotary shaft 31 to rotate integrally with the rotary shaft 31. The weight balance 35 is installed adjacent to the other end of the rotary shaft 31. That is, the weight balance 35 may be installed on an opposite side to the impeller 20.

The weight balance 35 may be formed to balance rotation of a rotor assembly including the impeller 20 and the rotor 30.

FIG. 5 is a longitudinal cross-sectional view illustrating a rotor assembly of the suction motor according to an embodiment of the disclosure rotatably supported by a bearing assembly.

As illustrated in FIG. 5, when the rotor assembly is supported by the bearing assembly 40, in an axial direction (arrow A), that is, in the length direction of the rotary shaft 31, the impeller 20 is positioned at one end of the rotary shaft 31, the bearing assembly 40 is positioned on one side of the impeller 20, the permanent magnet 33 is positioned on one side of the bearing assembly 40, and the weight balance 35 is positioned on one side of the permanent magnet 33.

A size, a weight, and a shape of the weight balance 35 may be determined so that the impeller 20 and the permanent magnet 33 installed on both sides of the bearing assembly 40, respectively, may rotate without shaking when the rotor 30 is rotated in a state where the bearing support portion 31b of the rotary shaft 31 is supported by the bearing assembly 40 as described above. In other words, the weight balance 35 is formed so that the impeller 20 positioned on one side of the bearing assembly 40 and the permanent magnet 33 and the weight balance 35 positioned on the other side of the bearing assembly 40 achieve rotational balance when the rotary shaft 31 rotates.

For example, when the rotary shaft 31 is rotated in a state where the rotary shaft 31 having one end portion to which the impeller 20 is fixed and the other end portion to which the permanent magnet 33 and the weight balance 35 are fixed is supported by the bearing assembly 40, if shaking of the rotary shaft 31 exceeds a reference value, a size or a weight of the weight balance 35 may be changed to allow the shaking of the rotary shaft 30 to become the reference value or less.

As another example, a sub-weight balance 37 may be installed on the rotary shaft 31 between the bearing assembly 40 and the permanent magnet 33. The sub-weight balance 37 may be used to balance the rotation of the rotor assembly in which the impeller 20 is installed, similar to the weight balance 35 described above.

For example, when the rotary shaft 31 is rotated in a state where the rotary shaft 31 having one end portion to which the impeller 20 is fixed and the other end portion to which the sub-weight balance 37, the permanent magnet 33 and the weight balance 35 are sequentially fixed is supported by the bearing assembly 40, if shaking of the rotary shaft 31 exceeds a reference value, sizes or weights of the sub-weight balance 37 and the weight balance 35 may be changed to allow the shaking of the rotary shaft 30 to become the reference value or less.

In addition, the sub-weight balance 37 may be formed of a fixing ring supporting an inner race of the bearing assembly 40.

The bearing assembly 40 is installed on one side of the impeller 20, and supports the rotary shaft 31 so that the rotary shaft 31 may rotate. The bearing assembly 40 is fixed to the stator assembly 50, and supports the bearing support portion 31b of the rotary shaft 31. Therefore, the bearing assembly 40 is installed between the impeller 20 and the permanent magnet 33 in the length direction of the rotary shaft 31. When the sub-weight balance 37 is installed on the rotary shaft 31, the bearing assembly 40 is installed between the impeller 20 and the sub-weight balance 37.

The bearing assembly 40 may include a first bearing 41, a second bearing 42, and a sleeve 43.

The first bearing 41 is installed to rotatably support the rotary shaft 31 on one side of the impeller 20. The second bearing 42 is installed to be spaced apart from the first bearing 41 by a predetermined gap and rotatably support the rotary shaft 31. The first bearing 41 and the second bearing 42 are installed in parallel to each other, an inner race of the first bearing 41 and an inner race of the second bearing 42 are fixed to the rotary shaft 31, and an outer race of the first bearing 41 and an outer race of the second bearing 42 are fixed by the sleeve 43. The first bearing 41 and the second bearing 42 may use bearings having the same specification. Therefore, an inner diameter, an outer diameter, and a height of the first bearing 41 are the same as those of the second bearing 42.

A spacer 44 may be installed between the first and second bearings 41 and 42 to maintain a gap G between the first and second bearings 41 and 42. The spacer 44 is installed between the inner race of the first bearing 41 and the inner race of the second bearing 42 to allow the inner race of the first bearing 41 and the inner race of the second bearing 42 to maintain a predetermined gap G therebetween. The spacer 44 may be formed in a ring shape.

To reduce a size of the suction motor 1 in an axial direction, the gap G between the first bearing 41 and the second bearing 42 needs to be as small as possible. However, the first bearing 41 and the second bearing 42 should be able to minimize the shaking of the rotary shaft 31 at the time of the rotation of the rotor assembly including the impeller 20, and the first bearing 41 and the second bearing 42 thus need to be spaced apart by a predetermined distance. In the present embodiment, to this end, the gap G between the first and second bearings 41 and 42 may be determined to be equal to or smaller than an outer diameter D of the first bearing 41 or the second bearing 42. Alternatively, the gap between the first and second bearings 41 and 42 may be determined to be equal to or smaller than a height H of the first bearing 41 or the second bearing 42.

The gap G between the first bearing 41 and the second bearing 42 may be determined to be a thickness of the spacer 44. Therefore, the thickness of the spacer 44 may be determined to be equal to or smaller than the outer diameter of the first bearing 41 or the second bearing 42. Alternatively, the thickness of the spacer 44 may be determined to be equal to or smaller than the height H of the first bearing 41 or the second bearing 42.

In addition, a wave washer 45 may be installed between the outer race of the first bearing 41 and the outer race of the second bearing 42. The wave washer 45 is provided to apply a preload to the first bearing 41 and the second bearing 42 in the axial direction of the rotary shaft 31. Therefore, the wave washer 45 applies an elastic force to the first bearing 41 and the second bearing 42 in opposite directions.

In the present embodiment, the wave washer 45 is used to apply the preload to the first bearing 41 and the second bearing 42, but a method of applying the preload is not limited thereto. An elastic member that is installed between the first bearing 41 and the second bearing 42 and may apply an elastic force to the outer race of the first bearing 41 and the outer race of the second bearing 42 may be used instead of the wave washer 45.

When the sub-weight balance 37 is installed on the rotary shaft 31, the sub-weight balance 37 may be installed to support the inner race of the second bearing 42. That is, the sub-weight balance 37 may be formed as a fixing ring supporting the inner race of the second bearing 42.

Figure 6:
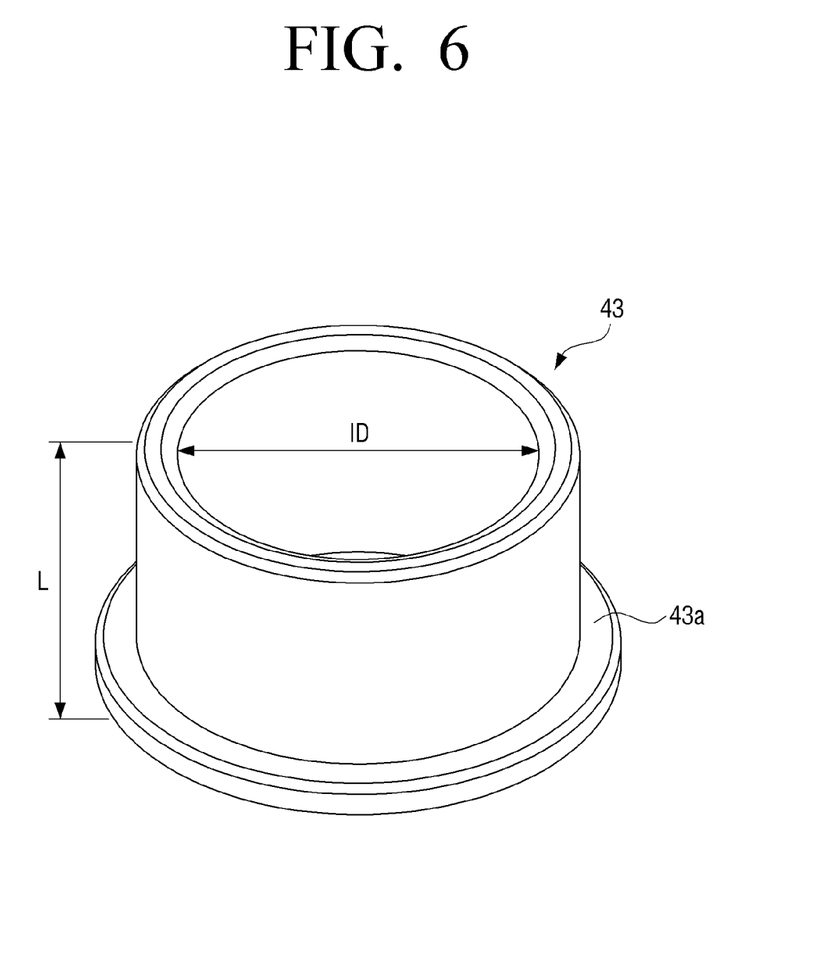
FIG. 6 is a perspective view illustrating a sleeve of the suction motor according to an embodiment of the disclosure.

FIG. 6 is a perspective view illustrating a sleeve of the suction motor according to an embodiment of the disclosure.

The sleeve 43, which is for fixing the first bearing 41 and the second bearing 42 to the stator assembly 50, is formed in a hollow cylindrical shape. The sleeve 43 fixes the outer race of the first bearing 41 and the outer race of the second bearing 42, as illustrated in FIG. 4. Therefore, an inner diameter ID of the sleeve 43 is formed to have a size in which the outer race of the first bearing 41 and the outer race of the second bearing 42 may be inserted and fixed. In addition, the sleeve 43 may be formed to have a length L corresponding to an entire height of the first bearing 41, the spacer 44, and the second bearing 42.

In addition, the sleeve 43 includes a flange 43a extending vertically from one end thereof, and the flange 43a is fixed to a fixing end 62 of a diffuser 60 described below. Thus, the bearing assembly 40 assembled by the sleeve 43 with the flange 43a is not separated from the stator assembly 50 in the axial direction.

In addition, the sleeve 43 may be formed of a metal having strength. In this case, the stator assembly 50 fixing the sleeve 43 may be formed of plastic or resin. Therefore, a manufacturing cost and a weight of the suction motor 1 may be reduced as compared with a case where the stator assembly 50 is formed of a metal.

The stator assembly 50 is installed around the permanent magnet 33 of the rotor 30, and fixes the bearing assembly 40. The stator assembly 50 may include a diffuser 60 and a stator 70.

Figure 7:
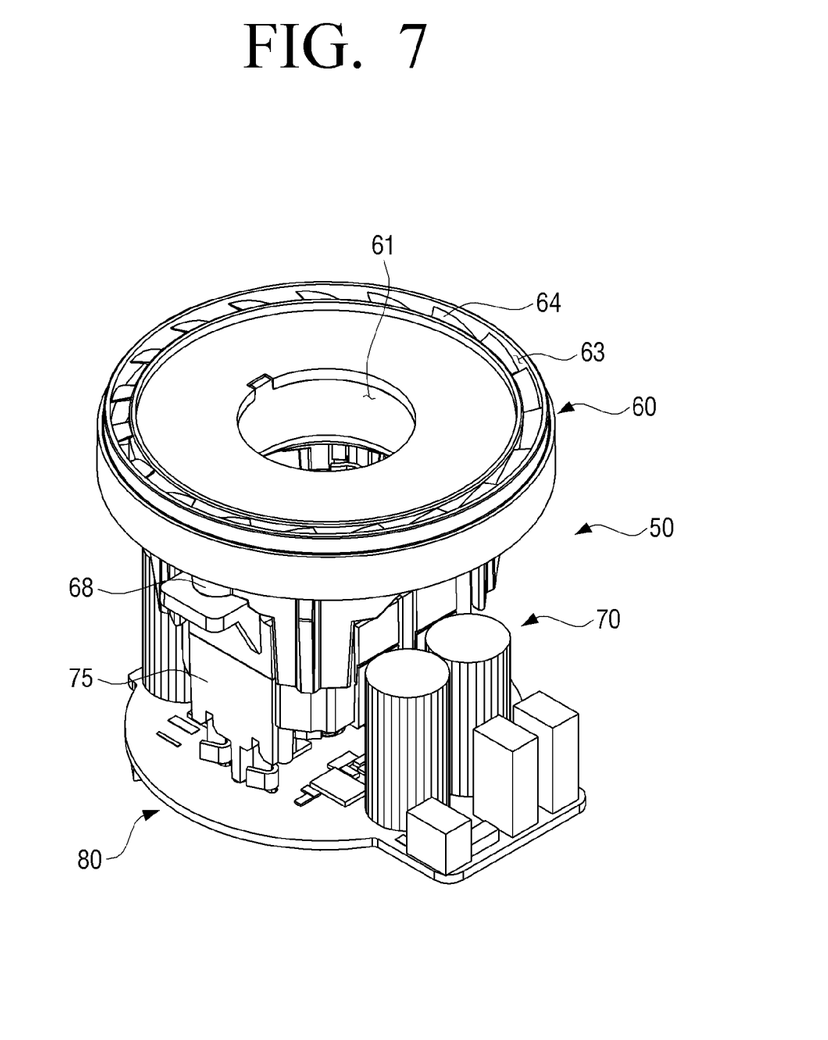
FIG. 7 is a perspective view illustrating a stator assembly of the suction motor according to an embodiment of the disclosure.

FIG. 7 is a perspective view illustrating a stator assembly of the suction motor according to an embodiment of the disclosure.

The diffuser 60 is formed to guide the air discharged from the impeller 20 downward, that is, toward the stator 70. The diffuser 60 is formed in a substantially disk shape, and a sleeve assembly hole 61 to which the sleeve 43 of the bearing assembly 40 is coupled is provided at the center of the diffuser 60. A lower end of the sleeve assembly hole 61 may be provided with the fixing end 62 to which the flange 43a of the sleeve 43 is coupled. A height of the sleeve assembly hole 61 is formed to correspond to the length of the sleeve 43.

An edge portion of the diffuser 60 is provided with a plurality of air holes 63 into which the air discharged from the impeller 20 is introduced, in a circumferential direction. The plurality of air holes 63 are provided with a plurality of guide ribs 64, respectively. That is, one air hole 63 is provided with one guide rib 64. Each guide rib 64 is formed as a curved surface starting from one end of the air hole 63 and bent downward. Therefore, the air introduced into the plurality of air holes 63 of the diffuser 60 moves downward of the diffuser 60 along the guide rib 64.

The inlet cover 10 described above is coupled to an upper end of an edge of the diffuser 60. Therefore, a space in which the impeller 20 may rotate is provided between the diffuser 60 and the inlet cover 10. The air discharged from the plurality of openings 24 provided in the outer circumferential surface of the impeller 20 is guided to the plurality of air holes 63 of the diffuser 60 along the edge of the inlet cover 10.

Figure 8:
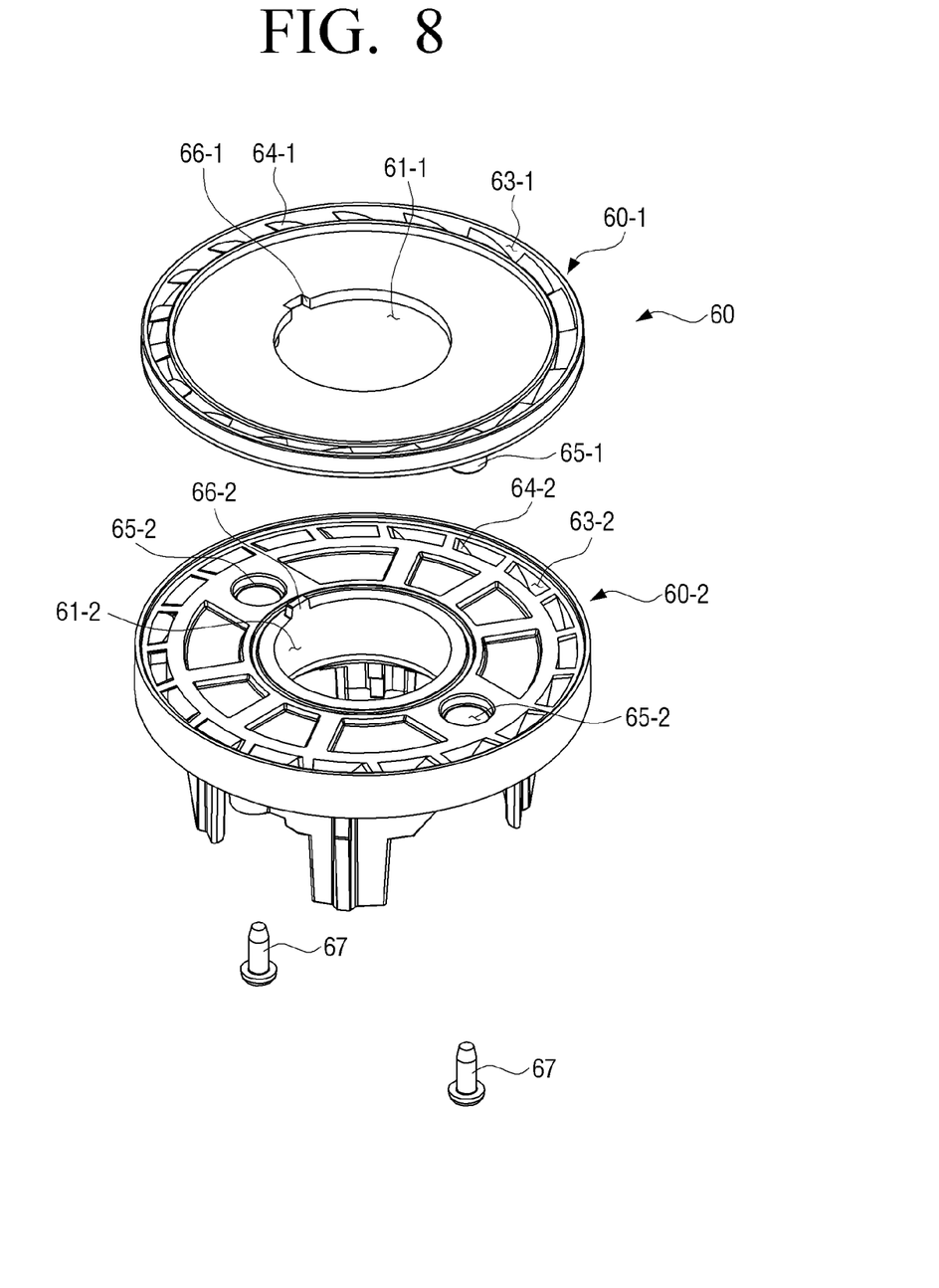
FIG. 8 is an exploded perspective view of a diffuser of the suction motor according to an embodiment of the disclosure.

The diffuser 60 may include an upper diffuser 60-1 and a lower diffuser 60-2, as illustrated in FIG. 8. FIG. 8 is an exploded perspective view of a diffuser of the suction motor according to an embodiment of the disclosure.

The upper diffuser 60-1 is formed in a substantially disk shape, and an upper sleeve assembly hole 61-1 into which the sleeve 43 of the bearing assembly 40 is inserted is provided at the center of the upper diffuser 60-1. An edge of the upper diffuser 60-1 is provided with a plurality of upper air holes 63-1 into which the air discharged from the impeller 20 is introduced, in the circumferential direction. Each of the plurality of upper air holes 63-1 is provided with an upper guide rib 64-1. The upper guide rib 64-1 is formed as a curved surface starting from one end of the upper air hole 63-1 and bent downward.

A lower surface of the upper diffuser 60-1 is provided with two coupling protrusions 65-1 protruding downward. Each coupling protrusion 65-1 may be provided with a female screw for screwing. In addition, an inner surface of the upper sleeve assembly hole 61-1 of the upper diffuser 60-1 is provided with a reference groove 66-1 for coupling to the lower diffuser 60-2.

The lower diffuser 60-2 is formed in a substantially disk shape, and a lower sleeve assembly hole 61-2 into which the sleeve 43 of the bearing assembly 40 is inserted is provided at the center of the lower diffuser 60-2. An edge of the lower diffuser 60-2 is provided with a plurality of lower air holes 63-2 into which the air discharged from the plurality of air holes 63-1 of the upper diffuser 60-1 is introduced, in the circumferential direction. Each of the plurality of lower air holes 63-2 is provided with a lower guide rib 64-2. The lower guide rib 64-2 is formed as a curved surface starting from one end of the lower air hole 63-2 and bent downward.

An upper surface of the lower diffuser 60-2 is provided with two coupling grooves 65-2 into which the two coupling protrusions 65-1 of the upper diffuser 60-1 are inserted. In addition, the upper surface of the lower diffuser 60-2 is provided with a reference protrusion 66-2 protruding from a circumference of the lower sleeve assembly hole 61-2. Therefore, when the reference protrusion 66-2 of the lower diffuser 60-2 is inserted into the reference groove 66-1 of the upper diffuser 60-1, the two coupling protrusions 65-1 of the upper diffuser 60-1 are inserted into the two coupling grooves 65-2 of the lower diffuser 60-2. Then, when screws 67 are fastened to the female screws of the coupling protrusions 65-1 of the upper diffuser 60-1 through the coupling grooves 65-2 of the lower diffuser 60-2, the upper diffuser 60-1 and the lower diffuser 60-2 are integrally coupled to each other.

In addition, a lower surface of the lower diffuser 60-2 may be provided with two coupling portions 68 for fixing the diffuser 60 to a stator frame 75 described below. The coupling portion 68 may be provided with a female screw to which a screw or a bolt may be coupled.

As illustrated in FIG. 8, when the diffuser 60 is formed to include the upper diffuser 60-1 and the lower diffuser 60-2, the air discharged from the impeller 20 passes through the upper guide ribs 64-1 of the upper diffuser 60-1 and the lower guide ribs 64-2 of the lower diffuser 60-2 that are doubly arranged, and then move downward.

The stator 70 is installed below the diffuser 60 to face the permanent magnet 33 of the rotor 30, and generates an electromagnetic force between the stator 70 and the permanent magnet 33 to allow the rotor 30 positioned at the center thereof to rotate. The stator 70 may include a core 71 and a coil 73 wound around the core.

The stator 70 includes a stator frame 75 supporting the core 71 and the coil 73, and the stator frame 75 and the diffuser 60 are fixed integrally with each other. For example, in the present embodiment, the diffuser 60 is fixed to the stator frame 75 with two screws or bolts 76 fastened to the coupling portion 68. Therefore, the bearing assembly 40 fixed to the diffuser 60 is fixed to the stator frame 75, and may thus stably support the rotor 30.

In addition, a control board 80 may be installed at a lower end of the stator frame 75. The control board 80 controls power applied to the coil 73 of the stator 70 to control the rotation of the suction motor 1. In addition, the control board 80 may be provided with a position detection sensor 82 capable of detecting a position of the magnet 81 for position detection installed at a lower end of the rotary shaft 31. As the position detection sensor 82, a hall sensor or a hall integrated chip (IC) capable of detecting a magnetic force may be used. The control board 80 may be the same or similar to a control board of a suction motor according to the related art, and a detailed description thereof is thus omitted.

Hereinafter, an operation of the suction motor according to an embodiment of the disclosure having the structure as described above will be described with reference to FIG. 4.

When power is applied to the stator 70 through the control board 80, the rotor 30 rotates by lines of magnetic force generated between the stator 70 and the permanent magnet 33 of the rotor 30.

Because the impeller 20 is fixed to one end of the rotor 30, when the rotor 30 rotates, the impeller 20 rotates to generate a suction force capable of sucking external air.

When the suction force is generated by the impeller 20, the external air is introduced into the suction port 22 of the impeller 20 through the inlet 11 of the inlet cover 10. The air introduced into the impeller 20 is discharged through the plurality of openings 24 provided in the outer circumferential surface of the impeller 20, and moves to the diffuser 60 along the edge of the inlet cover 10.

The air moved to the diffuser 60 is discharged downward, that is, toward the stator 70, through the plurality of air holes 63 of the diffuser 60. In this case, the plurality of air holes 63 are provided with the plurality of guide ribs 64, and the air introduced into the plurality of air holes 63 thus moves downward along the plurality of guide ribs 64 to cool the stator 70.

In the suction motor 1 according to an embodiment of the disclosure having the structure as described above, the impeller 20 and the permanent magnet 33 installed, respectively, on both sides of the rotary shaft 31 supported by the bearing assembly 40 may achieve rotational balance by the weight balance 35 provided on one side of the permanent magnet 33 in the rotary shaft 31, and the gap G between the two bearings 41 and 42 configuring the bearing assembly 40 may thus be made as narrow as possible. Therefore, in the suction motor 1 according to an embodiment of the disclosure, a length of the suction motor 1 in the axial direction may be made as short as possible.

The suction motor 1 according to an embodiment of the disclosure having the structure as described above has a structure in which the stator 70 is exposed to the outside, but the suction motor 1 may be housed in a separate housing so that the stator 70 is not exposed.

Figure 9:
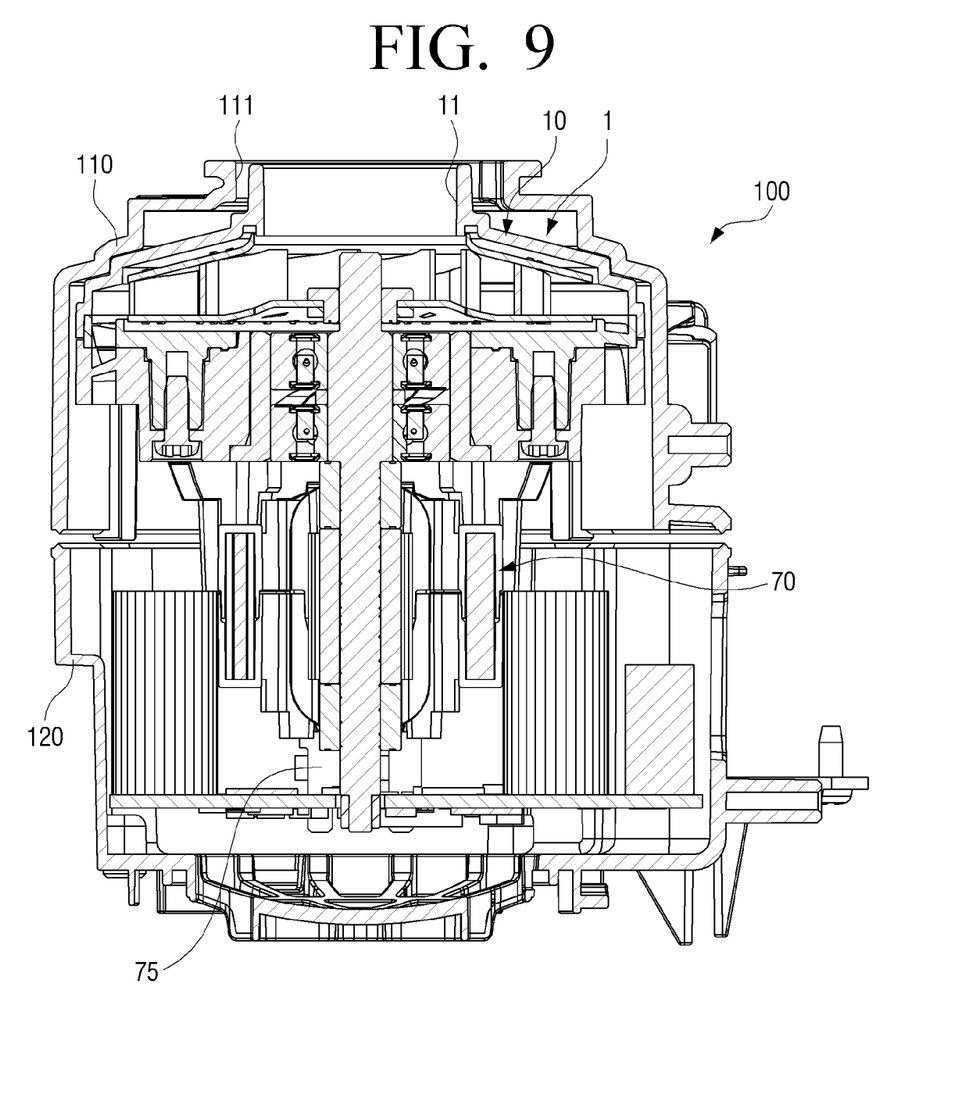
FIG. 9 is a longitudinal cross-sectional view illustrating a state where the suction motor according to an embodiment of the disclosure is housed in a housing.

FIG. 9 is a longitudinal cross-sectional view illustrating a state where the suction motor according to an embodiment of the disclosure is housed in a housing.

As illustrated in FIG. 9, a housing 100 includes an upper housing 110 and a lower housing 120, and the suction motor 1 is housed in an internal space formed by the upper housing 110 and the lower housing 120.

The upper housing 110 is provided with a through-hole 111 corresponding to the inlet 11 of the inlet cover 10 of the suction motor 1. The lower housing 120 is formed to fix the stator frame 75 of the suction motor 1. In addition, the lower housing 120 may be provided with a discharge port (not illustrated) through which the air passing through the stator 70 is discharged.

The upper housing 110 and the lower housing 120 may be coupled to each other by fastening portions (not illustrated) provided at a circumference of a lower end of the upper housing 110 and a circumference of an upper end of the lower housing 120.

A case where the suction motor 1 according to an embodiment of the disclosure is housed in the separate housing 100 has been illustrated and described in FIG. 9, but in a case where the suction motor 1 according to an embodiment of the disclosure is installed in a vacuum cleaner, the separate housing 100 may not be used.

In such a case, a fixing portion capable of fixing the suction motor 1 and a discharge port capable of discharging the air discharged from the suction motor 1 may be formed in a portion of a body of the vacuum cleaner in which the suction motor 1 is to be installed.

Figure 10:
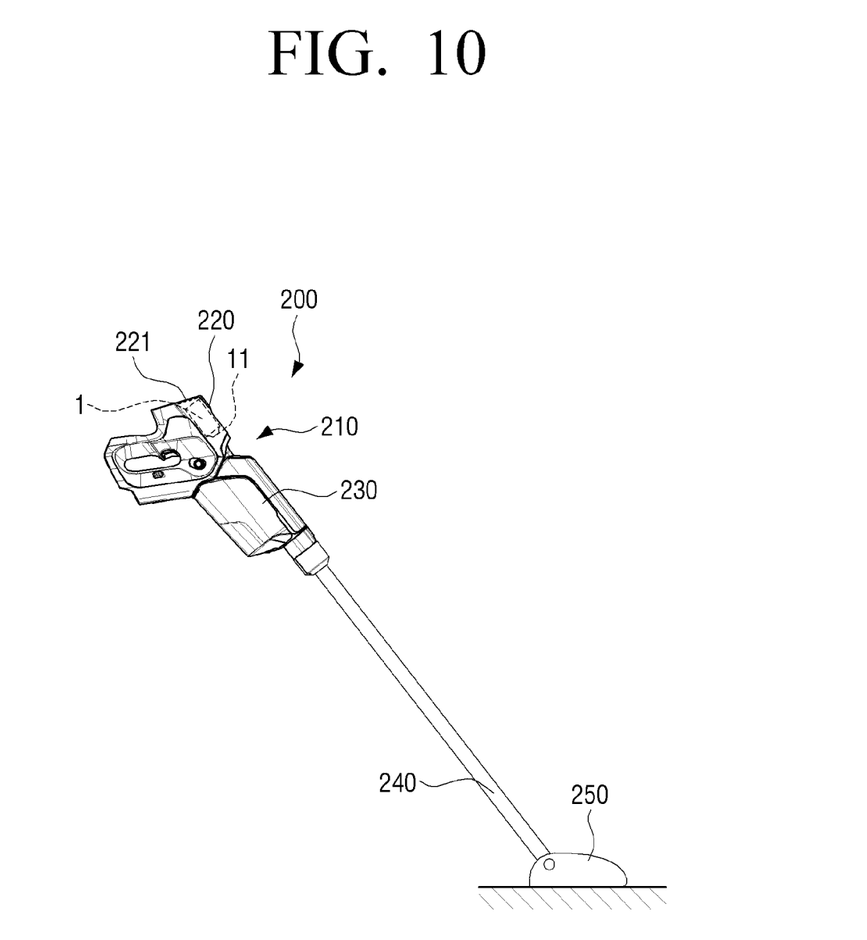
FIG. 10 is a view illustrating a handy-type cleaner in which the suction motor according to an embodiment of the disclosure is installed.

FIG. 10 is a perspective view illustrating a handy-type cleaner in which the suction motor according to an embodiment of the disclosure is installed.

Referring to FIG. 10, a handy-type cleaner 200 may include a cleaner body 210, an extension tube 240, and a suction nozzle 250.

The cleaner body 210 may include a dirt collection device 230 collecting introduced dirt and the suction motor 1 generating a suction force for sucking the dirt.

The dirt collection device 230 separates and collects the dirt from air containing the dirt, sucked by the suction force generated by the suction motor 1, and discharges the air from which the dirt is removed toward the suction motor 1 through an air discharge port. As the dust collection device 230, various kinds of devices capable of collecting dirt, such as a dust bag, a cyclone dust collector, and the like may be used.

The extension pipe 240 is connected to a dirt inlet of the dust collection device 230, and the suction nozzle 250 is connected to one end of the extension pipe 240. The suction nozzle 250 may be installed to be rotatable with respect to one end of the extension tube 240.

The suction motor 1 is connected to the dirt connection device 230, and generates a suction force allowing the air to be sucked together with the dirt into the dirt collection device 230. The inlet 11 of the inlet cover of the suction motor 1 is connected to the air discharge port of the dirt collection device 230.

The cleaner body 210 is provided with a fixing portion 220 in which the suction motor 1 may be installed, and one side of the fixing portion 220 is provided with a discharge port 221 through which the air passing through the stator of the suction motor 1 may be discharged.

Therefore, when the handy-type cleaner 200 is turned on, the impeller of the suction motor 1 rotates to generate the suction force. In this case, dirt on a surface to be cleaned is sucked together with air through the suction nozzle 250 and the extension tube 240, and is collected in the dirt collection device 230. The air from which the dirt is removed is discharged from the dirt collection device 230, passes through the impeller, the diffuser, and the stator of the suction motor 1, and is then discharged to the outside of the cleaner body 210 through the discharge port 221 of the cleaner body 210.

Figure 11:
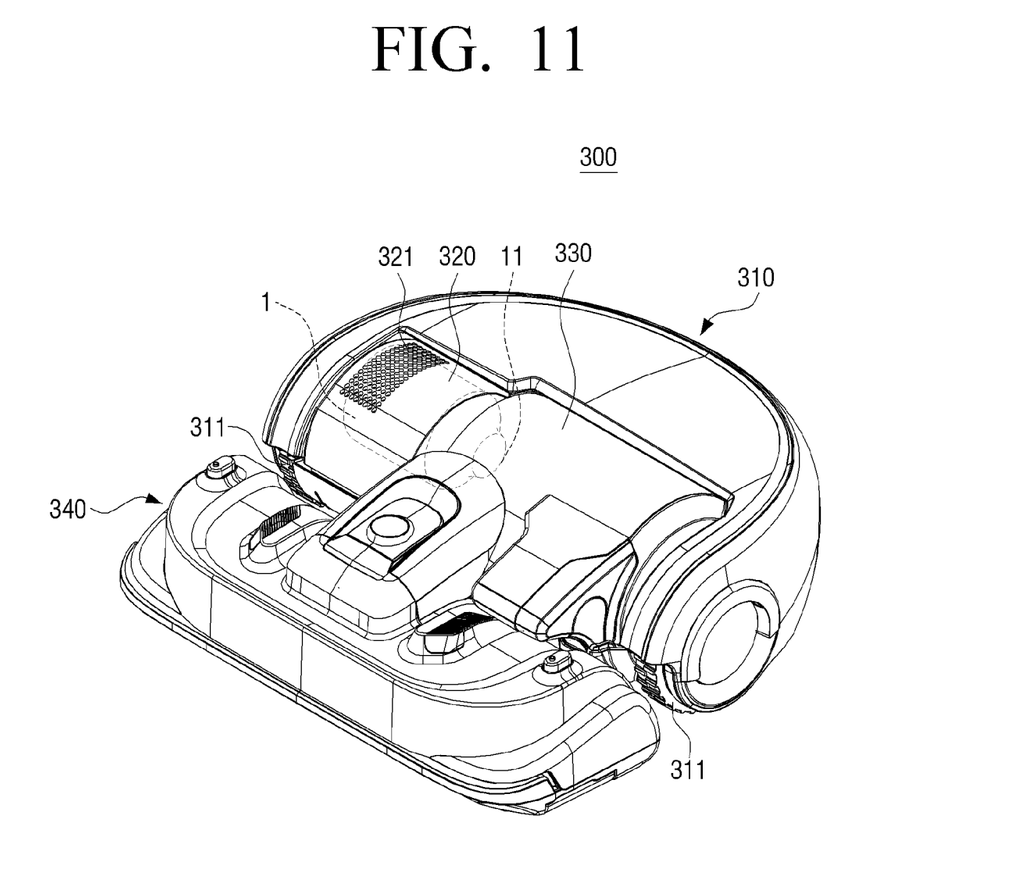
FIG. 11 is a view illustrating a robot cleaner in which the suction motor according to an embodiment of the disclosure is installed.

FIG. 11 is a cross-sectional view illustrating a robot cleaner in which the suction motor according to an embodiment of the disclosure is installed.

Referring to FIG. 11, a robot cleaner 300 may include a cleaner body 310 and a suction nozzle 340.

The cleaner body 310 may include a dirt collection device 330 collecting introduced dirt and the suction motor 1 generating a suction force capable of sucking the dirt. In addition, the cleaner body 310 may include a plurality of wheels 311 allowing the robot cleaner 300 to move, a driver (not illustrate) driving the plurality of wheels, a position detection sensor (not illustrated) capable of recognizing a position of the robot cleaner 300, and a controller (not illustrated) capable of controlling the driver and the suction motor 1. Therefore, the controller may control the robot cleaner 300 so that the robot cleaner 300 autonomously travels, and clean a surface to be cleaned using the suction motor 1 and the dirt collection device 330.

The dirt collection device 330 separates and collects the dirt from air containing the dirt, sucked by the suction force generated by the suction motor 1, and discharges the air from which the dirt is removed toward the suction motor 1 through an air discharge port. As the dust collection device 330, various kinds of devices capable of collecting dirt, such as a vacuum bag, a cyclone dust collector, and the like may be used.

The suction nozzle 340 is connected to a dirt inlet of the dirt collection device 330. The suction nozzle 340 may be installed to be rotatable with respect the cleaner body 310.

The suction motor 1 is connected to the dirt connection device 330, and generates a suction force allowing the air to be sucked together with the dirt into the dirt collection device 330. The inlet 11 of the inlet cover of the suction motor 1 is connected to the air discharge port (not illustrated) of the dirt collection device 330.

The cleaner body 310 is provided with a fixing portion 320 in which the suction motor 1 may be installed, and one side of the fixing portion 320 is provided with a discharge port 321 through which the air passing through the stator of the suction motor 1 may be discharged.

Therefore, when the controller of the robot cleaner 300 turns on the suction motor 1, the impeller of the suction motor 1 rotates to generate the suction force. In this case, dirt on a surface to be cleaned is sucked together with air through the suction nozzle 340, and is collected in the dirt collection device 330. The air from which the dirt is removed is discharged from the dirt collection device 330, passes through the impeller, the diffuser, and the stator of the suction motor 1, and is then discharged to the outside of the cleaner body 310 through the discharge port 321 of the cleaner body 310.

The suction motor 1 according to an embodiment of the disclosure having the structure as described above may be directly fixed to the body of the vacuum cleaner such as the handy-type cleaner 200 or the robot cleaner 300 without using a separate housing, and may have a length in the axial direction as small as possible to thus reduce a size of the vacuum cleaner.

Hereinabove, the disclosure has been described as an illustrative method. It is to be understood that terms used herein are provided to describe the disclosure rather than limiting the disclosure. Various modifications and alternations of the disclosure may be made according to the contents described above. Therefore, the disclosure may be freely practiced without departing from the scope of the claims unless additionally mentioned.

The invention claimed is:

1. A suction motor comprising:
a rotary shaft;
an impeller fixed to one end of the rotary shaft;
a bearing assembly installed on one side of the impeller and configured to rotatably support the rotary shaft;
a permanent magnet installed on the rotary shaft on one side of the bearing assembly;
a weight balance installed at another end of the rotary shaft on one side of the permanent magnet;
a sub-weight balance installed at the rotary shaft between the bearing assembly and the permanent magnet; and
a stator assembly installed around the permanent magnet,
wherein the weight balance and the sub-weight balance are formed so that the impeller, the permanent magnet, the weight balance, and the sub-weight balance achieve rotational balance based on the bearing assembly when the rotary shaft rotates.

2. The suction motor as claimed in claim 1, wherein the bearing assembly includes:
a first bearing installed on one side of the impeller and configured to rotatably support the rotary shaft;
a second bearing installed to be spaced apart from the first bearing and configured to rotatably support the rotary shaft;
a spacer installed between an inner race of the first bearing and an inner race of the second bearing;
a wave washer installed between an outer race of the first bearing and an outer race of the second bearing; and
a sleeve configured to fix the outer race of the first bearing and the outer race of the second bearing and formed in a hollow cylindrical shape.

3. The suction motor as claimed in claim 2, wherein a gap between the first and second bearings is equal to or smaller than an outer diameter of the first bearing or the second bearing.

4. A vacuum cleaner comprising:
a dirt collection device into which dirt is introduced; and
the suction motor as claimed in claim 3 connected to the dirt collection device and configured to generate a suction force allowing the dirt to be sucked into the dirt collection device.

5. The suction motor as claimed in claim 2, wherein a gap between the first and second bearings is equal to or smaller than a height of the first bearing or the second bearing.

6. A vacuum cleaner comprising:
a dirt collection device into which dirt is introduced; and
the suction motor as claimed in claim 5 connected to the dirt collection device and configured to generate a suction force allowing the dirt to be sucked into the dirt collection device.

7. The suction motor as claimed in claim 2, wherein the sleeve is fixed to the stator assembly.

8. The suction motor as claimed in claim 7, wherein the stator assembly includes:
a diffuser configured to guide air discharged from the impeller downward; and
a stator installed below the diffuser and facing the permanent magnet, and
wherein the sleeve is installed at a center of the diffuser.

9. The suction motor as claimed in claim 8, wherein the sleeve includes a flange extending vertically from one end thereof, and
the flange is fixed to a fixing end of the diffuser.

10. A vacuum cleaner comprising:
a dirt collection device into which dirt is introduced; and
the suction motor as claimed in claim 7 connected to the dirt collection device and configured to generate a suction force allowing the dirt to be sucked into the dirt collection device.

11. The suction motor as claimed in claim 2, wherein the sub-weight balance installed at the rotary shaft between the second bearing and the permanent magnet.

12. The suction motor as claimed in claim 11, wherein the sub-weight balance is configured to support the inner race of the second bearing.

13. A vacuum cleaner comprising:
a dirt collection device into which dirt is introduced; and
the suction motor as claimed in claim 2 connected to the dirt collection device and configured to generate a suction force allowing the dirt to be sucked into the dirt collection device.

14. A vacuum cleaner comprising:
a dirt collection device into which dirt is introduced; and
the suction motor as claimed in claim 1 connected to the dirt collection device and configured to generate a suction force allowing the dirt to be sucked into the dirt collection device.

15. A suction motor comprising:
a rotary shaft;
an impeller fixed to one end of the rotary shaft;
a first bearing configured to rotatably support the rotary shaft on one side of the impeller;
a second bearing installed to be spaced apart from the first bearing and configured to rotatably support the rotary shaft;
a spacer installed between an inner race of the first bearing and an inner race of the second bearing;
a sleeve configured to fix an outer race of the first bearing and an outer race of the second bearing and formed in a hollow cylindrical shape;
a permanent magnet installed on the rotary shaft on one side of the second bearing;
a weight balance installed at another end of the rotary shaft on one side of the permanent magnet;
a sub-weight balance installed at the rotary shaft between the second bearing and the permanent magnet; and
a stator assembly installed around the permanent magnet,
wherein a gap between the first and second bearings is equal to or smaller than an outer diameter of the first bearing or the second bearing, and
wherein the weight balance and the sub-weight balance are formed so that the impeller, the permanent magnet, the weight balance, and the sub-weight balance achieve rotational balance based on the first bearing and the second bearing when the rotary shaft rotates.

16. The suction motor as claimed in claim 15, wherein the stator assembly includes:
a diffuser configured to guide air discharged from the impeller downward; and
a stator installed below the diffuser and facing the permanent magnet, and
wherein the sleeve is installed at a center of the diffuser.

17. The suction motor as claimed in claim 15, wherein the sub-weight balance is configured to support the inner race of the second bearing.

18. The suction motor as claimed in claim 15, further comprising a wave washer installed between the outer race of the first bearing and the outer race of the second bearing.

19. A vacuum cleaner comprising:
a dirt collection device into which dirt is introduced; and
the suction motor as claimed in claim 15 connected to the dirt collection device and configured to generate a suction force allowing the dirt to be sucked into the dirt collection device.

* * * * *